Figure 1:
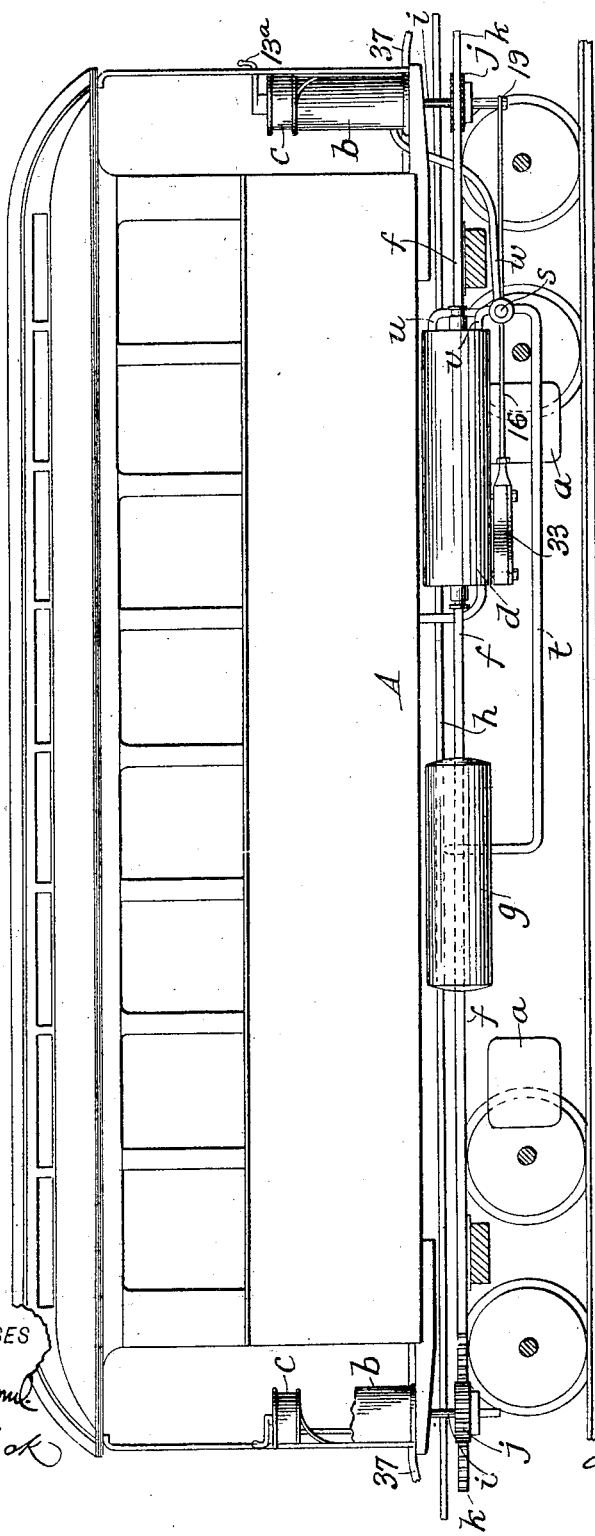

No. 645,767. Patented Mar. 20, 1900.
A. SUNDH.
CONTROLLER FOR ELECTRIC RAILWAY CARS.
(Application filed Sept. 25, 1899.)
(No Model.) 6 Sheets—Sheet 1.

WITNESSES
INVENTOR
August Sundh,
BY
A. P. Thayer.
ATTORNEY

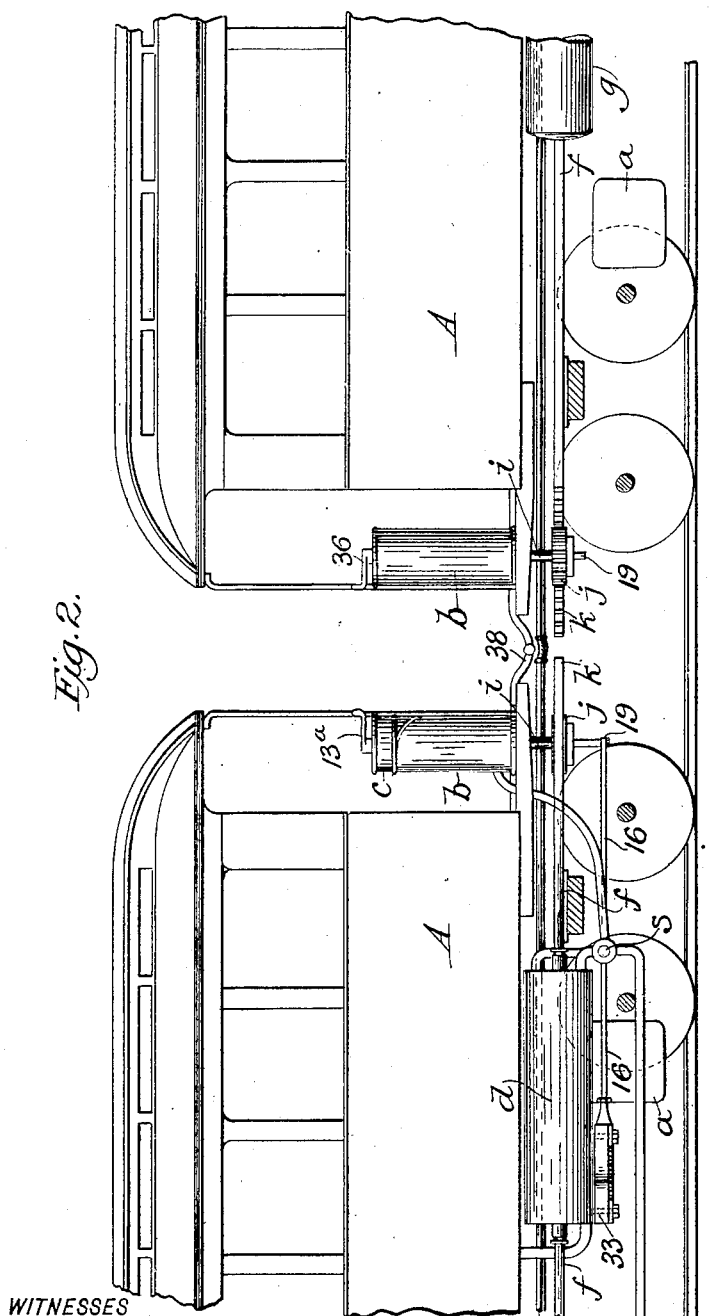

No. 645,767. Patented Mar. 20, 1900.
A. SUNDH.
CONTROLLER FOR ELECTRIC RAILWAY CARS.
(Application filed Sept. 25, 1899.)
(No Model.) 6 Sheets—Sheet 3.
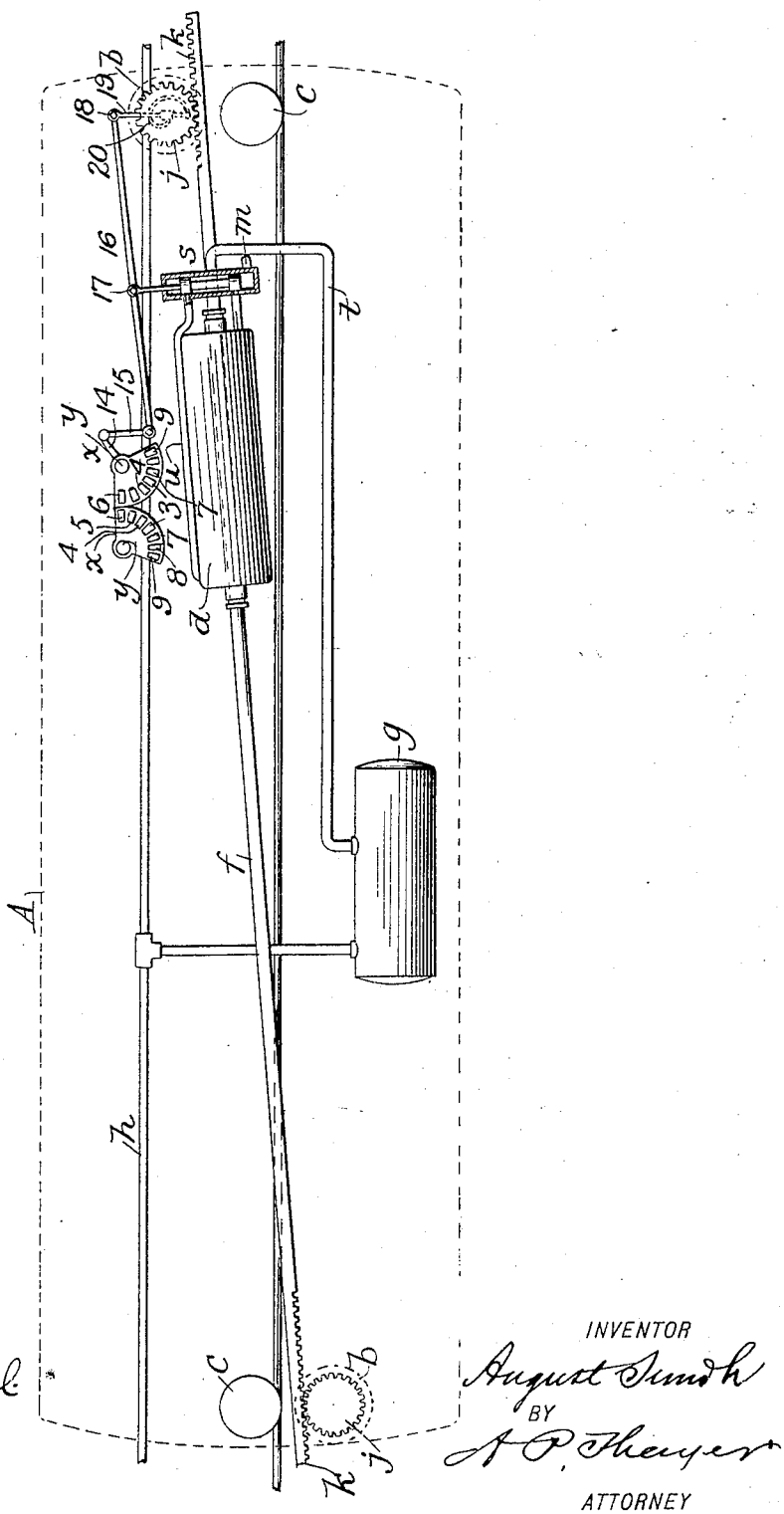
WITNESSES
James F. Duhamel.
C. Sedgwick.
INVENTOR
August Sundh
BY
A. P. Thayer
ATTORNEY No. 645,767. Patented Mar. 20, 1900.
A. SUNDH.
CONTROLLER FOR ELECTRIC RAILWAY CARS.
(Application filed Sept. 25, 1899.)
(No Model.) 6 Sheets—Sheet 4.
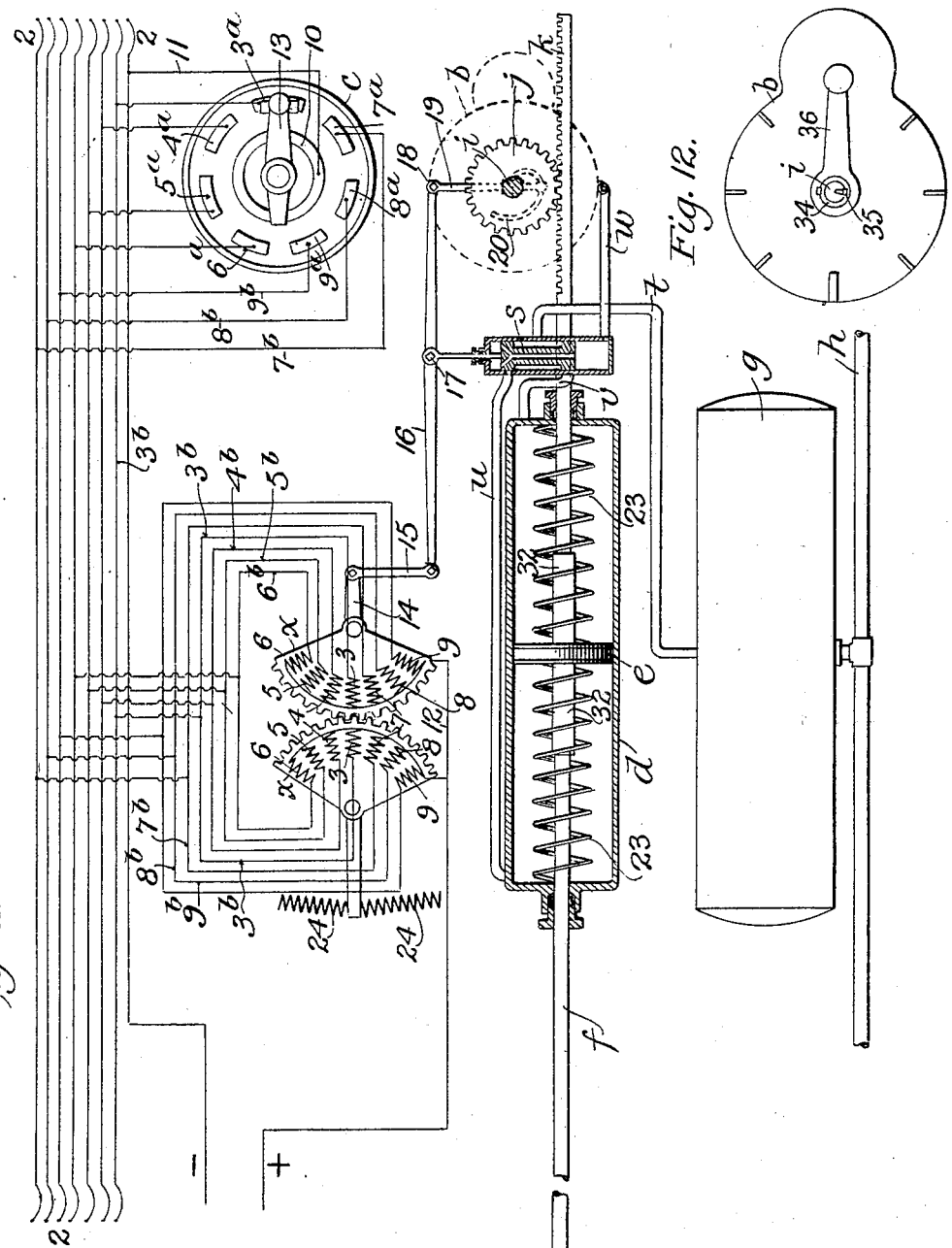
WITNESSES
INVENTOR
August Sundh
BY
A. P. Thayer
ATTORNEY No. 645,767. Patented Mar. 20, 1900.
A. SUNDH.
CONTROLLER FOR ELECTRIC RAILWAY CARS.
(Application filed Sept. 25, 1899.)
(No Model.) 6 Sheets—Sheet 5.
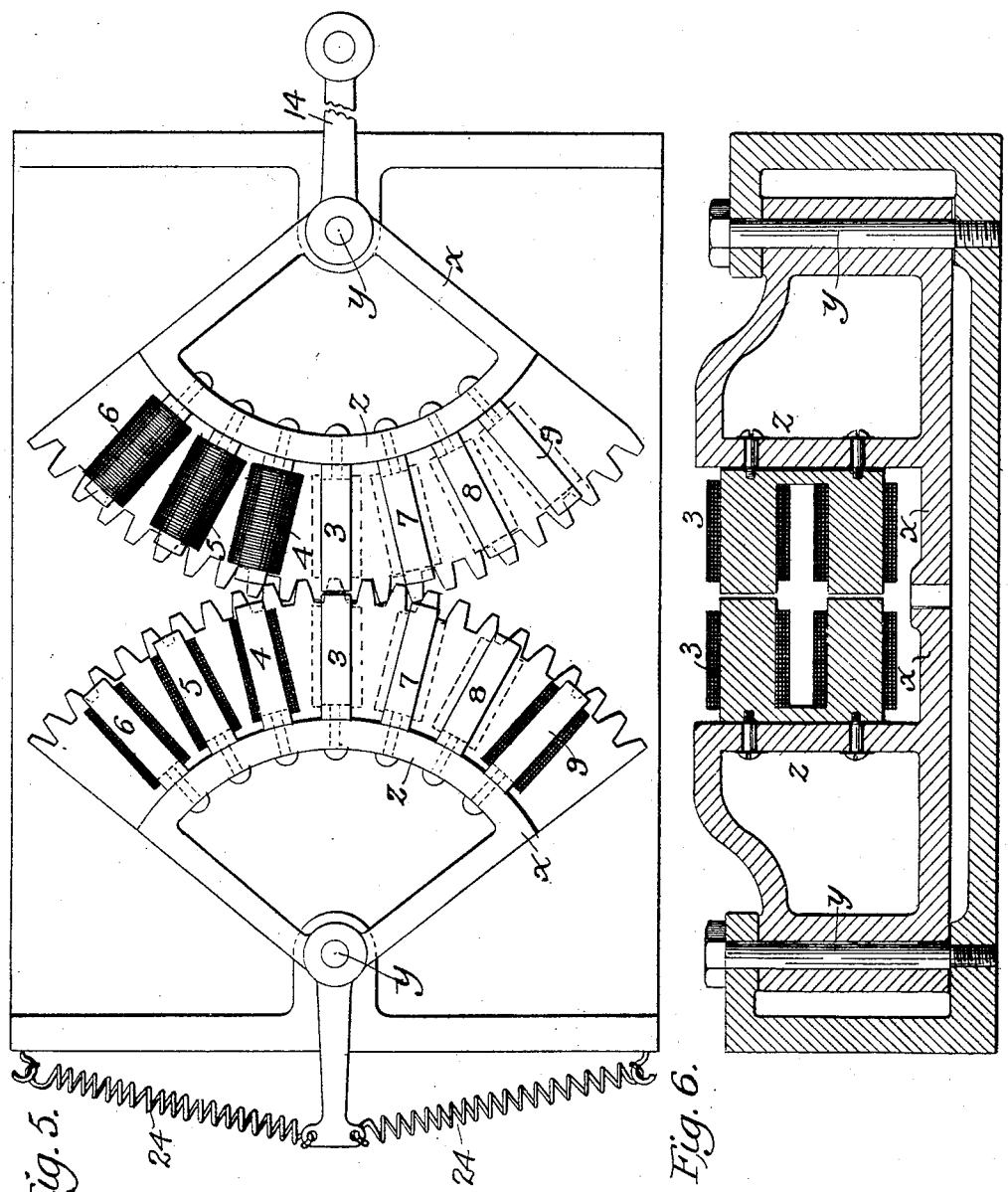
WITNESSES
INVENTOR
BY
ATTORNEY No. 645,767. Patented Mar. 20, 1900.
A. SUNDH.
CONTROLLER FOR ELECTRIC RAILWAY CARS.
(Application filed Sept. 25, 1899.)
(No Model.) 6 Sheets—Sheet 6.
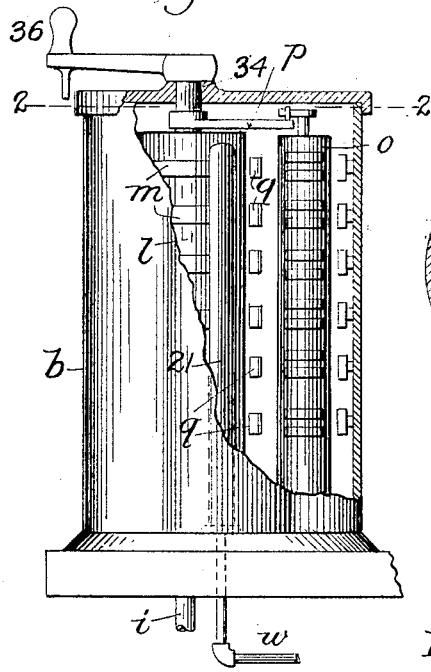
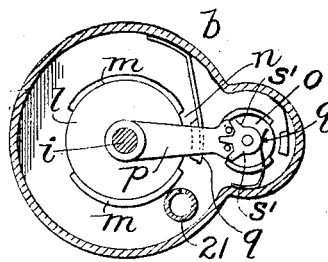
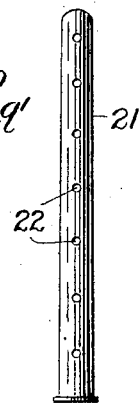
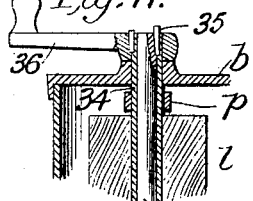
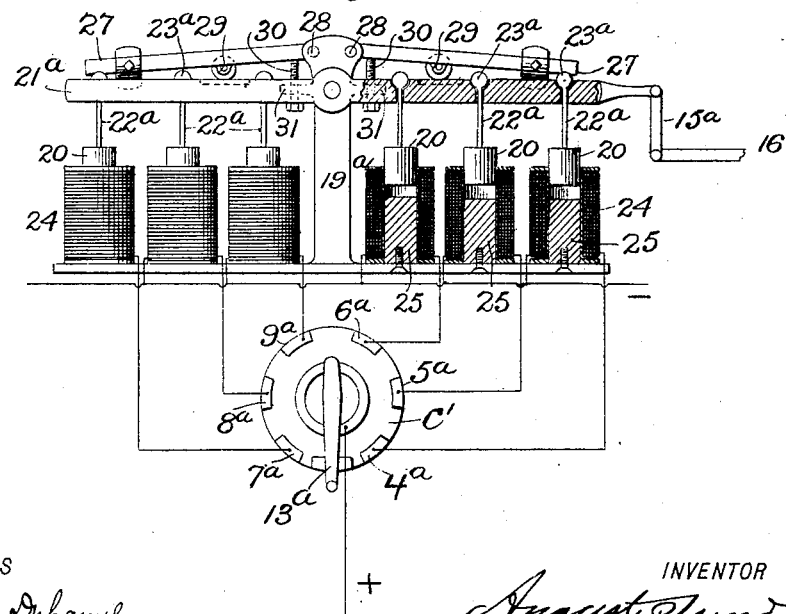
WITNESSES
INVENTOR
August Sundh
BY
A. P. Thayer
ATTORNEY

UNITED STATES PATENT OFFICE.

AUGUST SUNDH, OF YONKERS, NEW YORK.

CONTROLLER FOR ELECTRIC-RAILWAY CARS.

SPECIFICATION forming part of Letters Patent No. 645,767, dated March 20, 1900.

Application filed September 25, 1899. Serial No. 731,506. (No model.)

*To all whom it may concern:*

Be it known that I, AUGUST SUNDH, a citizen of the United States of America, and a resident of Yonkers, county of Westchester, and State of New York, have invented certain new and useful Improvements in Controllers for Electric-Railway Cars, of which the following is a specification.

These improvements relate to mechanism for governing the operation of an electric trolley-car from either platform by means of a manually-operative circuit-closer for closing an electric supply-circuit, which according to the character of the movement of the circuit-closer may be made to include either one of a group of branch circuits carried on the car and respectively employed to supply the current for the actuation of the several appurtenances by which the impulsion of the car is controlled. By merely coupling together a plurality of such cars and connecting their groups of branch circuits with one another all the impelling-motors of the cars thus made up into a train can be simultaneously started or stopped or otherwise synchronously governed in their operation by the appropriate manual actuation of either one of the circuit-closers on any one of the cars. There are employed in each car the usual two barrel-switches, arranged with the usual system of contacts and branch circuits for supplying the current from the main line to operate the usual two car-impelling motors under the usual variety of conditions.

The present invention embraces a cylinder for receiving at either end compressed air for driving either way from the middle of the cylinder a spring-retracted piston connected to a piston-rod which projects through both heads of the cylinder and is provided at its opposite ends with rack-teeth for engaging pinions affixed, respectively, to the shafts of the barrel-switches, and thereby imparting to the barrel-switches rotatory movements corresponding to the directions and ranges of the stroke of said piston; secondly, actuating mechanism for the valve which controls the supply of compressed air to said cylinder, consisting of a step-by-step vibratable electromagnetic motor for opening said valve by moving it, as required, either way from its median position and operating a cam synchronously with the barrel-switches for closing said valve by returning it to its median position; thirdly, a manually-operative circuit-closer on each platform in conjunction with the necessary group of branch circuits for governing the supply of the current to effect the vibration of the electromagnetic motor in the direction and to the extent required to set the barrel-switches in predetermined positions. I attain these objects by the mechanism illustrated in the accompanying drawings, in which—

Figure 1 is a side elevation of a car equipped with my improved apparatus with some parts in section. Fig. 2 is a side elevation of parts of two cars similarly equipped and coupled together, as in a train, and with some parts in section. Fig. 3 is a top view of my apparatus with a part in section and with the car-body and also the barrel-switches indicated in dotted lines. Fig. 4 is an enlarged diagrammatic illustration representing, partly in horizontal section and in their median or off position, the details of the barrel-switch-actuating mechanism and the electric governing apparatus shown in Fig. 3 and with the barrel-switches indicated in dotted lines. Figs. 5 and 6 represent in plan and section, respectively, details of the said electric governing apparatus enlarged for greater clearness. Fig. 7 is a sectional elevation of the barrel-switch. Fig. 8 is a horizontal section of the barrel-switch on line 2 2, Fig. 7. Fig. 9 is an elevation of a blow-out device for the barrel-switch, also shown in Figs. 7 and 8, which I employ in connection with the compressed-air barrel-switch actuator for disrupting the sparks in the controller. Fig. 10 is partly a side elevation and partly a sectional elevation of a modified form of step-by-step vibratable electromagnetic motor that may be employed in the electric governing apparatus of the controller-actuating mechanism. Fig. 11 is a vertical section of the upper part of the barrel-switch, showing a detachable connection of the barrel-switch to disconnect it from the actuating mechanism when the car is to be used separately and the barrel-switch is to be worked by hand. Fig. 12 is a top view of a barrel-switch.

A represents the car-body; $a$, the driving-motors; $b$, the barrel-switches; $c$, the circuit closing and opening switch of the electric governing apparatus for the barrel-switch-actuating mechanism; $d$, the cylinder of the compressed-air barrel-switch-actuating apparatus; $e$, the compressed-air-actuated piston; $f$, the rod coupling said piston and the barrel-switches $b$ of each car, and $g$ the compressed-air holder for supplying the air to operate the piston. The air may be supplied to the holders of the respective cars from any source by a train-pipe $h$, to be coupled from car to car, as usual.

The barrel-switches $b$ are located in the usual positions on the cars, or thereabout, with their shafts $i$ extending through the platforms and having a toothed pinion $j$, geared with the piston-rod $f$ by a toothed rack $k$ of each extremity, said piston-rod being extended from end to end of the car, so as to gear the two barrel-switches for actuating them synchronously by the one piston. The barrels or drums $l$ of the switches have duplicate sets of contacts $m$ on opposite sides of an intermediate space $n$. The reversing-switch $o$ is located radially to the middle of this intermediate space when the drum stands in the "off" position, and the drum-shaft carries a switch-shifting arm $p$, that turns said switch and reverses the current whenever the drum is shifted for changing the connection of the brushes $q$ from one to the other of the sets of contacts $m$ for running the car in opposite directions. The spring $q'$ lodges in the angles $s'$, respectively, to retain the switch in its set positions. When the drum is in the off position, the piston $e$ for operating it must be in the middle position relatively to the cylinder to move in either direction for so shifting the drum, according as the car is to run one way or the other.

To operate the piston, compressed air supplied to the valve $s$ from the tank $g$ through pipe $t$ is admitted to one or the other of the ends of the cylinder through pipes $u$ or $v$, according as the valve is shifted one way or the other. $w$ indicates the exhaust-pipe. The piston must not only be shifted in either direction, but it must also be shifted step by step and be held in different positions corresponding with the different steps of the contacts of the barrel-switch drum $l$, the number of which may, as indicated in this example, be three on each side of the drum. (See Fig. 12.) To shift the drum and stop and hold it at any desired point, as when a contact is made for closing the motor-circuit, a certain quantity of air must be admitted to the cylinder, sufficient to effect the desired movement of the drum. The supply must then be shut off and the air admitted must be retained to hold the drum until another change is to be made. For so opening the valve I have provided a step-by-step vibratable electromagnetic motor comprising a series of magnets and a governing-switch or circuit-closer therefor, said magnets being respectively connected in separate circuits with the respective contacts of the governing-switch to be operated individually and being collectively connected with the valve for opening it successively, and for closing the valve said valve is connected with a cam on the shaft of the barrel-switch drum, which closes the valve automatically as the drum shifts from one position to another; but said valve may of course be connected with any part moving synchronously with the barrel-switch. Various different arrangements of the magnets may be employed for so opening the valve, and the means of utilizing the barrel-switch drum-shaft for closing the valve may be varied at will. The arrangement of magnets comprising the said step-by-step vibratable electromagnetic motor that I prefer consists of a rotatory toothed gear system in which two segments of toothed wheels $x$, pivoted at $y$, are geared together, so as to rotate forward and backward the limit of the range of their toothed faces. Each of these gears has on one side a hub $z$, of less than the full radius of the gears, whereon a series of electromagnets is mounted at equal distances apart around the hub, with their cores parallel with the axes of the gears and with the magnets of the two segments arranged in pairs, the poles of which will abut each other closely when in the line cutting the axes of the two segments. These magnets are so wound that the poles of the respective pairs will attract each other mutually when energized by an exciting-current and will turn the segments until the excited magnets meet in the middle position, provided the excited magnets be sufficiently near the middle position to have the power to do so. The system of operation is such that it is always the pair next to the middle position that is utilized for the next operation, and here the distance between the poles is so slight that the power is ample. The said magnets are suitably insulated from the supporting-hubs of the segments, and each pair is connected with a contact in the governing-switch by an independent circuit, as follows: The middle pair is connected with the contact $3^a$ by the wire $3^b$. The upper pairs 4, 5, and 6 are connected with the contacts $4^a$, $5^a$, and $6^a$ by the circuit-wires $4^b$, $5^b$, and $6^b$, and the lower magnets 7, 8, and 9 are similarly connected with contacts $7^a$, $8^a$, and $9^a$ by the wires $7^b$, $8^b$, and $9^b$. The current is brought into the contact-ring 10 of the switch by the circuit-wire 11.

12 indicates the return-wire from the magnets.

13, Fig. 4, is the rotating circuit-closer of the switch, and $13^a$, Fig. 1, is the handle for operating said circuit-closer.

The wires 3 to 11, inclusive, are to be coupled along the train, as indicated at 2.

One of the wheel-segments has a rigid arm 14, that is connected by a link 15 with one end of a valve-operating lever 16, to which the valve-stem is connected at 17, and the other end of said lever is connected at 18 to a rod or bar 19, having a stud-pin working in an eccentric slot 20 in the pinion j, by which the motor-controller is geared with the controller-actuating piston, so that said rod or bar 19 will be reciprocated lengthwise as the barrel-switch drum is rotated. Any other means of causing such reciprocation synchronously with the shifting of the barrel-switch may be employed.

To the exhaust-pipe w for the barrel-switch-actuating cylinder a blow-out stand-pipe 21 is attached, which is located within the switch-inclosing case in suitable proximity to the brushes q and having suitable discharge-orifices 22 for blowing out the arcs when the cylinder is exhausted and the drum is returned to the off position and the contacts are broken. Jets from the compressed-air holder directly may be employed for the blow-out.

The operation is as follows: As represented in Fig. 4 of the drawings, all the parts are in the off position, the car being at rest. Suppose the circuit-closer to be shifted onto contact 4. The magnets 4 of the rotating segments will be energized and they will shift into the middle position, raising arm 14, which will raise valve s and open the port, admitting air into the left-hand end of the cylinder through pipe u. The piston e will move to the right, turning the barrel-switch to the left, making the proper contacts of the motor-circuit for setting the car in motion. At the same time the eccentric slot 20 in the pinion j will begin to pull lever 16 down to close the valve, and it will be closed by this operation at the moment the circuit is closed in the barrel-switch, and the barrel-switch will then stop and continue at rest as long as the governor-circuit 4 remains closed. It is obvious that further movement of the barrel-switch to the next step of its contacts in the same direction will result if circuit-closer 13 be shifted onto the next contact 5, and so on for all of the contacts to be closed by the movement of the barrel-switch in that direction. If now the barrel-switch is to be reversed for reducing the speed of the car and the closer 13 be shifted back, say, from contact 5 to contact 4, magnets 4 of the gear-segments will be returned to the middle position, which, by the downward movement of arm 14 thus caused, and owing to the low position of bar 19 in the eccentric slot 20, will open the exhaust through pipe u, permitting escape of some of the air behind the piston, which will then move backward under the influence of one of the springs 23 in the cylinder, shifting the barrel-switch onto the corresponding contact and at the same time raising lever 16 and again closing the valve and preventing further escape of air. The adjustment of the valve and its connections with the cam and the magnet-carrying segments is such that should the drum be turned too far the valve will thereby pass beyond the closing-point and will slightly open the exhaust from the overpassed side of the piston and the piston will automatically reverse and return the drum to the right position and at the same time close the exhaust, and the piston and drum will be held at rest. When circuit-closer 13 is returned to the contact 3, further exhaust of the cylinder will occur and the piston will return to the middle position, returning the barrel-switch to its middle position and again closing the valve. In Figs. 1 and 2 the magnetic gears are represented as inclosed in a case 33. Springs 23 are also intended for causing the return of the piston e to the middle position within the cylinder, and springs 24 are provided in connection with one of the magnet-carrying segments to return them to the middle position at any time when the current may happen to be accidentally interrupted, and thus automatically set the barrel-switch in the off position to protect the motor from the effects of full current suddenly applied again. The piston-rod f is provided with stop-shoulders 32 to take effect on the heads of the cylinders to properly limit the movement of the piston. In Fig. 10 I represent a modified arrangement of magnets in the said step-by-step vibratable electromagnetic motor for operating the valve of the compressed-air-controller actuator.

Two series of three solenoids each are set upright on opposite sides of a supporting-post $19^a$, with their cores suspended from lever $21^a$, pivoted on said post, and connected at one end by link $15^a$ with the valve-operating lever 16, said cores being so suspended that the lever may continue to move after the cores have reached their limit of movement, the means of suspending them being rods $22^a$, extending through the lever and having heads $23^a$ above to hold the cores when the lever rises and the rods being free in the holes to permit the lever to descend after the cores have reached the limit of their movement. Any other means of so suspending the core may be employed.

In each solenoid-cylinder 24 there is a stationary stop-core 25 to limit the descent of the movable core, which stops are so graduated that the several magnets of the series will operate the lever step by step successively. Thus beginning with the magnet nearest the outermost extremity of the lever the first step of its movements will be effected when connection is made with contact $4^a$ in the governing-switch $c'$ by the switch-closer $13^a$, and the second and third steps will be effected in like manner as the closer is shifted onto the contacts $5^a$ and $6^a$ successively to effect full movement of the barrel-switch in one direction. In like manner the other series of magnets will operate the valve for shifting the barrel-switch in the other direction, according as circuit-closer $13^a$ is connected with contacts $7^a$, $8^a$, and $9^a$, all of the contacts of the switch being in suitable connection with the magnets for so actuating them. The means for returning the valve and the magnet-cores to the middle position in this case consists of the weighted levers 27, pivoted at 28 on the standard 19ª and bearing at 29 on the lever 21ª, with a stop-screw 30 to limit their fall and relieve the lever 21ª of their weight when it reaches the middle position. The stops 30 are set in arms 31 of the standard 19ª and are adjustable to regulate the position of lever 21.

The shaft $i$ of the barrel-switch drum $l$ is fitted within a sleeve 34, which is secured to the shaft by a key 35 when the drum is to be actuated by the piston, the drum being fitted to the sleeve so as to be rotated by it; but the key is fitted detachably, so that when the car is to be used independently of other cars and it is not required to operate the drum by the piston the piston may be disconnected by removing the key, and the drum may be operated by the handle 36 as in the usual way, said handle being positively fitted to the sleeve.

As both of the barrel-switches of a car are coupled to the actuator, only one circuit-closer might serve for each car; but it is preferred to have one on each end of the car, so that it can be run in either direction to better advantage when used singly.

The circuit-wires are arranged in protective tubular casings 37, and the train-circuits are coupled together from car to car with suitable flexible joints 38.

What I claim as my invention is—

1. In an electric car, the combination with the electric motor and barrel-switch, of a compressed-fluid actuator for the said switch, means for controlling said actuator consisting of electromagnetic valve-opening mechanism and a governing-circuit closer therefor in the control of the motorman, and valve-closing mechanism, automatically actuated synchronously with the operation of the barrel-switch.

2. In an electric car, the combination with the electric motor and barrel-switch, of a compressed-fluid actuator for the said switch, consisting of a fluid-impelled reciprocating piston geared with the barrel-switch shaft, electromagnetic valve-opening mechanism and a governing-circuit closer therefor in the control of the motorman, and valve-closing mechanism automatically actuated synchronously with the operation of said barrel-switch.

3. In an electric car, the combination with the electric motor and barrel-switch, of a compressed-fluid actuator for the said switch consisting of a fluid-impelled reciprocating piston normally at rest intermediately of opposite ranges of movement for operating the barrel-switch reversely, and geared with the barrel-switch shaft, electromagnetic valve-opening mechanism, and a governing-circuit closer therefor in the control of the motorman and adapted for opening the valve to either side of said piston, and valve-closing mechanism automatically actuated synchronously with the operation of the barrel-switch.

4. In an electric car, the combination with the electric motor and barrel-switch, of a compressed-fluid actuator for the said switch consisting of a fluid-impelled reciprocating piston geared with the barrel-switch shaft, electromagnetic valve-opening mechanism and a governing-circuit closer therefor in the control of the motorman, and adapted to open the valve in several steps successively, and valve-opening mechanism automatically actuated synchronously with the operation of the barrel-switch and to close the valve after each opening step.

5. In an electric car, the combination with the electric motor and barrel-switch, of a compressed-fluid actuator for the said switch consisting of a fluid-impelled reciprocating piston, geared with the barrel-switch shaft, and normally at rest intermediately of opposite ranges of movement for operating the barrel-switch reversely, electromagnetic valve-opening mechanism and a governing-circuit closer therefor in the control of the motorman, valve-closing mechanism automatically actuated synchronously with the operation of the barrel-switch and springs to return the piston to the normal position.

6. In an electric car, the combination with the electric motor and barrel-switch, of a compressed-fluid actuator for the said switch, means for controlling said actuator consisting of a step-by-step vibratable electromagnetic motor, and a manually-operated governing-circuit closer therefor, and valve-closing mechanism automatically actuated synchronously with the step-by-step operations of the barrel-switch.

7. The combination in a step-by-step vibratable electromagnetic motor, of a pair of rotatory intermeshing toothed gears, a series of radially-disposed electromagnets on each gear so placed that the respective magnets of each gear meet successively in pairs in the line cutting the axes of the gears with their poles abutting in close proximity, a governing-switch closer and independent circuit-wires connecting the respective pairs of magnets and contacts for actuating the gears, said magnets wound for mutual attraction of the poles of the respective pairs of magnets.

8. In an electric car, the combination with the electric motor and barrel-switch, of a compressed-fluid actuator for said switch, a step-by-step vibratable electromagnetic valve-opening motor consisting of a pair of rotatory intermeshing toothed gears, a series of radially-disposed electromagnets on each gear so placed that the respective magnets of each gear meet successively in pairs in the line cutting the axes of the gears with their poles abutting in close proximity, a governing-switch closer and independent circuit-wires connecting the respective pairs of magnets and contacts for actuating the gears, said magnets wound for mutual attraction of the poles of the respective pairs of magnets.

9. In an electric car, the combination with the electric motor and barrel-switch, of a compressed-fluid actuator for said switch, a stepby-step vibratable electromagnetic valve-opening motor consisting of a pair of rotatory intermeshing toothed gears, a series of radially-disposed electromagnets on each gear so placed that the respective magnets of each gear meet successively in pairs in the line cutting the axes of the gears with their poles abutting in close proximity, a governing-switch closer and independent circuit-wires connecting the respective pairs of magnets and contacts for actuating the gears, said magnets wound for mutual attraction of the poles of the respective pairs of magnets, and valve-closing mechanism automatically actuated synchronously with the operation of the barrel-switch.

10. In an electric-car-train system, comprising a plurality of cars coupled together, the combination with the motor and barrel-switch, of a compressed-fluid actuator for the said switch, and electromagnetic valve-opening mechanism for the actuator, in each of the cars, a governing-switch closer in one or more of the cars, and circuit-wires connecting said closer or closers with the valve-opening mechanism in each car, and means in each car for automatically closing the valve.

11. In an electric-car-train system comprising a plurality of cars coupled together, the combination with the motor and barrel-switch, of a compressed-fluid actuator for the said barrel-switch and electromagnetic valve-opening mechanism for the actuator in each car, a governing-switch closer in one or more of the cars, circuit-wires connecting said closer or closers with the valve-opening mechanism and adapted to open the valve in several steps successively, and means in each car for automatically closing the valve in corresponding steps and successively to the opening steps respectively.

12. In an electric-car-train system comprising a plurality of cars coupled together, the combination with the motor and barrel-switch, of a compressed-fluid actuator for the said switch, and electromagnetic valve-opening mechanism for the actuator in each car, a governing-switch closer in one or more of the cars, circuit-wires connecting said closer or closers with the valve-opening mechanism and adapted to open the valve to either side of the piston for operating the controller reversely in several steps successively, and means in each car for automatically closing the valve successively to the opening steps respectively.

13. In an electric-car-train system comprising a plurality of cars coupled together, the combination with the motor and barrel-switch, of a compressed-fluid actuator for the said switch, a step-by-step vibratable electromagnetic valve-opening motor consisting of a pair of rotatory intermeshing toothed gears, a series of radially-disposed electromagnets on each gear so placed that the respective magnets of each gear meet successively in pairs in the line cutting the axes of the gears with the poles abutting in close proximity in each car, a governing-switch closer in one or more of the cars, circuit-wires connecting said closer or closers with the valve-opening mechanism and adapted to open the valve to either side of the piston for operating the controller reversely, in several steps successively, and means in each car for automatically closing the valve successively to the opening steps respectively.

14. In an electric car, the combination with the motor and barrel-switch, of a compressed-fluid actuator for the said switch, a valve for controlling the said actuator, a series of magnets, and a governing switch or circuit closer for operating the magnets to open the valve, said magnets being respectively connected in separate circuits with the respective contacts of the governing-switch to be operated individually, and collectively connected with the valve for operating it successively.

15. The combination with the motor and motor-controller, of a compressed-fluid actuator for the controller, and an exhaust-pipe of the actuator provided with jet-orifices in relation to the motor-contacts for blowing out the arcs of the opening contacts by the exhaust-jets of the actuator.

Signed by me at New York, N. Y., this 20th day of July, 1899.

AUGUST SUNDH.

Witnesses:
C. SEDGWICK,
J. M. HOWARD.